Nov. 11, 1924. 1,515,399

J. NEMETH

DIRIGIBLE HEADLIGHT FOR AUTOMOBILES

Filed Nov. 29, 1922

Patented Nov. 11, 1924.

1,515,399

UNITED STATES PATENT OFFICE.

JOSEPH NEMETH, OF NEW BRUNSWICK, NEW JERSEY.

DIRIGIBLE HEADLIGHT FOR AUTOMOBILES.

Application filed November 29, 1922. Serial No. 604,006.

*To all whom it may concern:*

Be it known that I, JOSEPH NEMETH, a citizen of Hungary, residing at New Brunswick, in the county of Middlesex and State of New Jersey, have invented certain new and useful Improvements in Dirigible Headlights for Automobiles, of which the following is a specification.

This invention relates to certain new and useful improvements in dirigible headlights for automobiles wherein the bracket arms supporting the headlights are associated with the steering rod of the automobile wheel shifting mechanism to cause the headlights to be moved upon vertical pivots for casting light rays directly forwardly of the automobile when making a turn.

With the above and other objects in view, the invention consists of the novel form, combination and arrangement of parts hereinafter more fully described, shown in the accompanying drawing and claimed.

Figure 1:
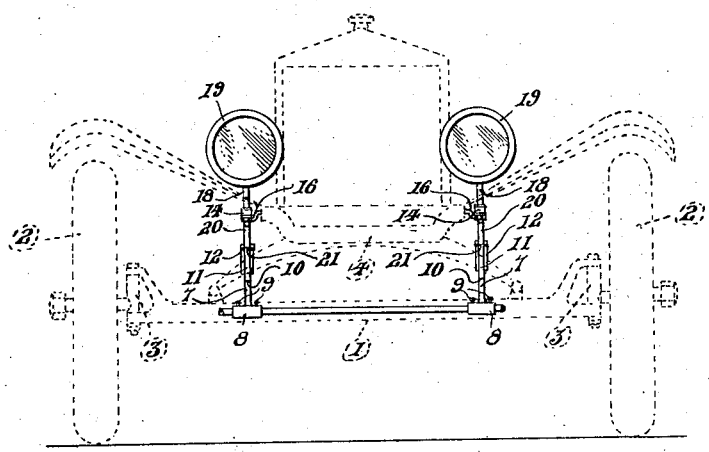
Figure 1:
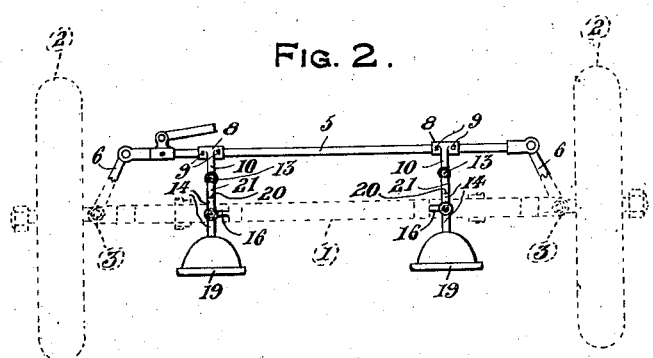
Figure 1:
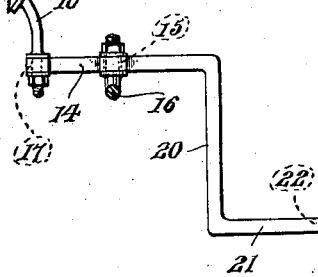
Figure 1:
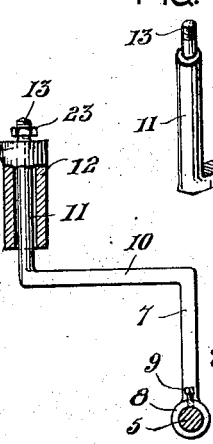
Figure 1:
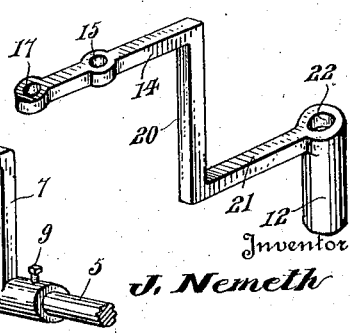

In the drawing, wherein like reference characters designate corresponding parts throughout the several views, Figure 1 shows by dotted lines, and diagrammatically, a front elevational view of an automobile with the dirigible headlight mechanism in operative position thereon, Figure 2 is a top plan view of the dirigible headlight mechanism, the front axle and front wheels of the automobile being illustrated by dotted lines, Figure 3 is a side elevational view of the bracket construction extending between the steering rod of the wheel shifting mechanism and one of the headlights, Figure 4 is a perspective view of the angle bracket arm connected to the steering rod, and Figure 5 is a perspective view of the angle bracket arm supporting one of the headlights and pivotally mounted on the frame of the automobile.

Referring more in detail to the accompanying drawing, there is illustrated by dotted lines in Figs. 1 and 2, the front end of an automobile, preferably of the Ford type embodying a front axle 1, front steering wheels 2, steering knuckles 3 and a frame bar 4 with which the dirigible headlight mechanism is associated.

As shown more clearly in Fig. 2, the steering rod 5 has a link connection 6 at each end thereof with the adjacent steering knuckles 3 while the light shifting mechanism is associated with the frame bar 4 and the steering rod 5.

An angle bracket including a perpendicular leg 7 having a sleeve bearing 8 at the lower end thereof is anchored by set screws 9 to the steering rod 5, an angle bracket of this type being secured to the steering rod 5 adjacent each end thereof as shown in Figs. 1 and 2, the upper end of the perpendicular leg 7 carrying a forwardly directed right angular extension 10 that is bent upwardly at its outer end to provide a perpendicular leg 11, the upper end of the leg 11 being reduced to provide an extension screw plug 13 as clearly shown in Fig. 4.

An angle bracket including an upper horizontal leg 14 is provided with an opening 15 that receives a pivot pin carried by the bracket 16 projecting laterally from the frame bar 4 of the automobile, the outer end of the horizontal leg 14 being provided with an opening 17 in which the lower end of the shaft 18 supporting the headlight 19 is secured as clearly shown in Fig. 3. The opposite end of the horizontal leg 14 is angularly bent to provide a depending leg 20 that is rearwardly bent at right angles at its lower end as at 21, the outer end of which is provided with an eye portion 22 and a depending sleeve 12 that is mounted upon the leg 11 and rotatably retained in position thereon by the nut 23 threaded on the screw plug 13.

When the steering rod is shifted for turning the steering wheels 2, the pivotally connected angle bracket extending between the frame bar 4 of the automobile and the steering rod 5, causes the angle brackets to pivotally move relative to each other with the upper leg 14 of the upper angle bracket pivotally shifting upon the bracket 16 carried by the frame bar 4 for shifting the headlight 19 to cast the light rays therefrom in a direction following the steering wheels 2. With a bracket mounting of this character, the headlights are positioned a greater distance forwardly of the body of the automobile and increased flexibility is established between the headlights and the operating mechanism therefor.

While there is herein shown and described the preferred embodiment of the present invention, it is nevertheless to be understood that minor changes may be made therein without departing from the spirit and scope of the invention as claimed.

What is claimed as new is:—

Dirigible headlight mechanism for automobiles comprising in combination with the automobile steering rod and a frame bar of a chassis, upper and lower angle brackets extending in stepped formation between the steering rod and frame bar, a headlight carried by the forward end of the upper angle bracket, the forward portion of said upper angle bracket rearwardly of the headlight being pivoted to the frame bar, a vertical sleeve carried by the lower end of the upper angle bracket pivoted to and adapted for vertical sliding movement on the upper portion of the lower bracket, and a horizontal sleeve carried by the lower end of the lower angle bracket adjustably secured on the steering rod.

In testimony whereof I affix my signature.

JOSEPH NEMETH.